UNITED STATES PATENT OFFICE.

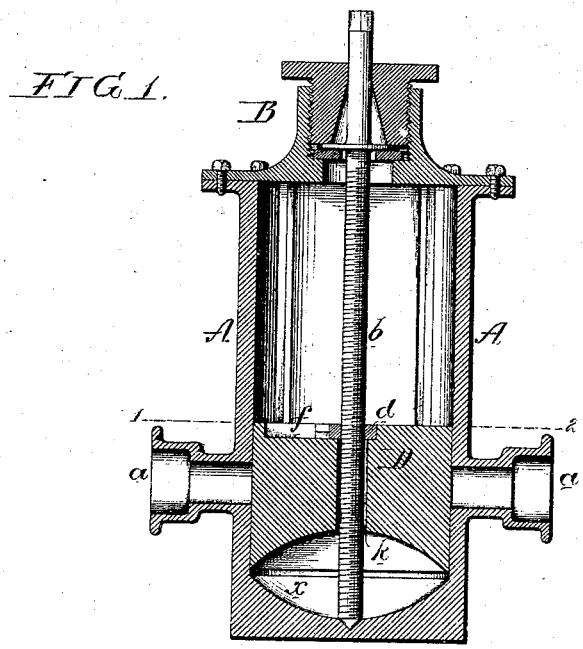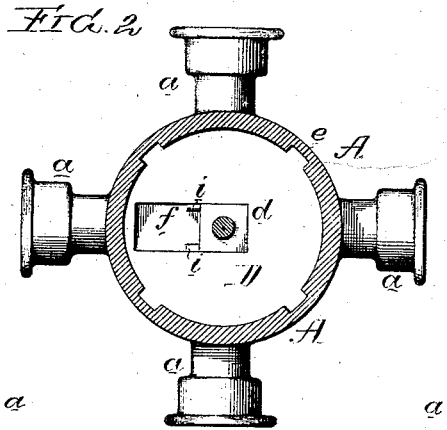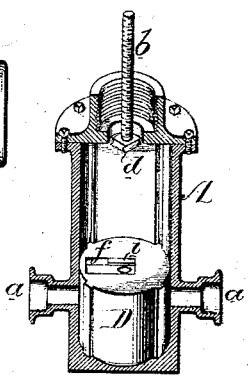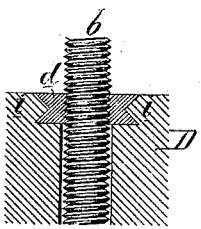

ROBERT BARTON, OF PHILADELPHIA, PENNSYLVANIA, ASSIGNOR OF ONE-HALF HIS RIGHT TO WILLIAM JOHNSTON, OF SAME PLACE.

IMPROVEMENT IN VALVES FOR WATER-MAINS.

Specification forming part of Letters Patent No. 168,824, dated October 19, 1875; application filed February 24, 1875.

*To all whom it may concern:*

Be it known that I, ROBERT BARTON, of Philadelphia, Pennsylvania, have invented certain Improvements in Valves for Water-Mains, of which the following is a specification:

The object of my invention is to provide for the ready detaching of the screw-spindle of a sliding valve without removing the valve or disturbing the outer casing. These objects I attain in the manner which I will now proceed to describe, reference being had to the accompanying drawing, in which—

Figure 1 is a vertical section of my improved valve for water-mains; Fig. 2, a sectional plan on the line 1 2, Fig. 1; Figs. 3 and 4, sectional perspective view, showing the manner of removing the operating nut; and Fig. 5, a detached sectional view of part of the valve.

A is the outer casing, provided, in the present instance, with four branches, $a$, each of which is constructed for the reception of the end of a water-pipe. The valve-casing has at the top a stuffing-box, B, through which passes the screw-spindle $b$, the latter turning in a bearing formed in the bottom of the said casing, and having a collar so confined in the stuffing-box as to turn, but not move vertically, therein, and the thread of the spindle being adapted to a nut, $d$, attached to the valve D, in a manner described hereafter. This valve D has any desired number of vertical ribs, $e$, adapted to corresponding grooves in the interior of the casing, as shown in Fig. 2, these ribs serving to prevent the valve from turning in the said casing. The under side of the valve is made concave, as shown in Fig. 1, and forms, with the concave bottom of the valve-casing, a chamber, $x$, for the reception of small stones or dirt, which may be introduced through the branches $a$ into the casing below the valve, and which, but for the form of the chamber $x$, might prevent the closing of the said valve to the desired extent. The nut $d$ is attached to the valve in the manner shown in Figs. 1, 2, and 5. In the top of the valve is formed a recess, $f$, the edges of the outer portion of which are straight, but at and near the center are adapted to V-shaped grooves on opposite edges of the nut, so that when the latter has become worn and has to be removed the follower of the stuffing-box B is first withdrawn, and the spindle $b$ moved to the inclined position shown in Fig. 3, this movement forcing the nut $d$ along the recess $f$ to a point where it is free from the control of the V-shaped ribs, when it is at liberty to be withdrawn with the spindle, as shown in Figs. 3 and 4.

The mode of inserting a new nut will be readily understood without explanation.

By thus employing one valve at a point where two or more water-mains intersect each other the usual multiplicity of water cut-offs is obviated, and the operation of cutting off the water in any particular locality much facilitated.

I claim as my invention—

The combination of the screw-spindle $b$, nut $d$, and its V-shaped grooves with the recess $f$ in the valve, the said recess having edges partly V-shaped and partly straight, all as and for the purpose set forth.

In testimony whereof I have signed my name to this specification in the presence of two subscribing witnesses.

ROBERT BARTON.

Witnesses:
 HUBERT HOWSON,
 HARRY SMITH.